Patented June 24, 1941

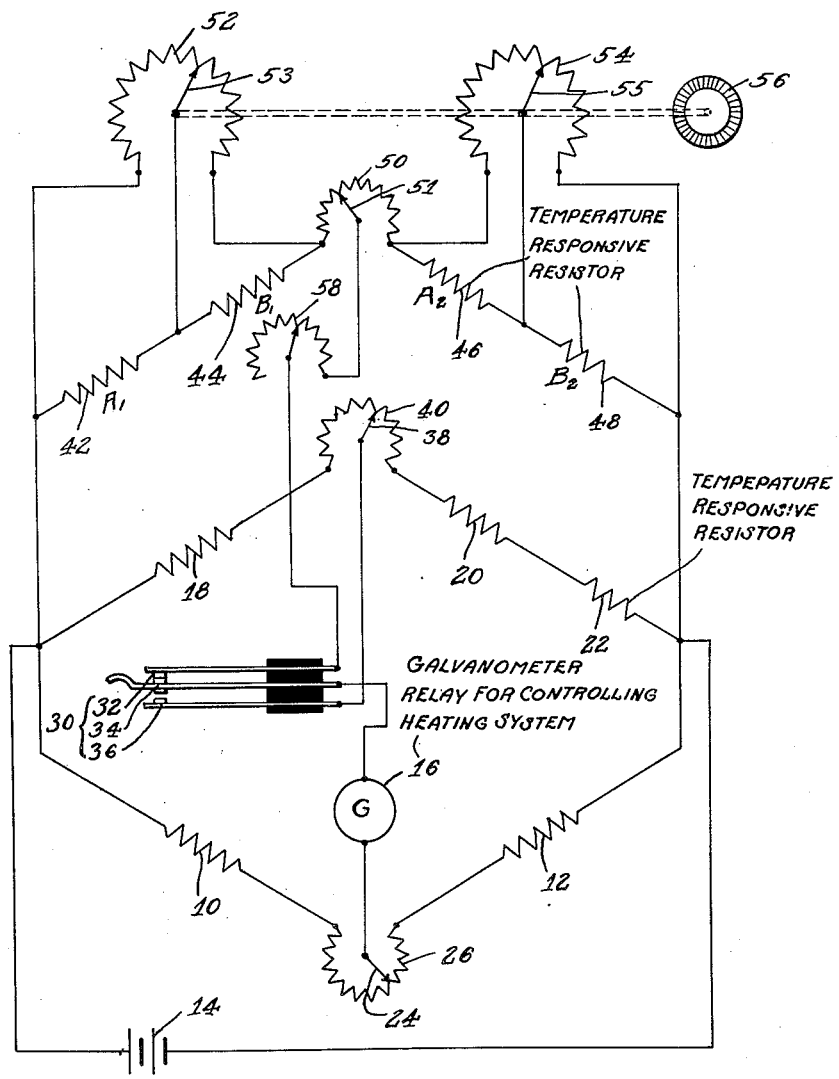

2,246,575

UNITED STATES PATENT OFFICE 2,246,575

ELECTRIC BRIDGE CIRCUIT

Edwin De Witt Coleman, Maywood, Ill., assignor to Micro Switch Corporation, Freeport, Ill., a corporation of Illinois Application March 20, 1939, Serial No. 263,072
In Great Britain March 25, 1938

8 Claims. (Cl. 73—342)

The present invention generally relates to electric bridge circuits, and more particularly to Wheatstone bridge circuits for making measurements of temperature and the like.

It is particularly suited for use in temperature control systems for buildings such as the system described and shown in my Patent 2,144,105, dated January 17, 1939. That prior patent discloses a Wheatstone bridge circuit containing temperature responsive resistors responsive respectively to outside temperature and to the temperature of the heating system, which bridge circuit, without making any separate measurements of the two temperatures, measures a condition dependent upon both of those two temperatures or upon a relation between them. The heating system is then regulated in accordance with the measured value of that temperature condition or relation. Thus, for example, the outside temperature is taken as an index of the rate of loss of heat from the interior of the building or space to be heated, and the temperature of the heating system is taken as an index of the rate of heat input to the space to be heated. The simultaneous measurement of these two conditions determines simply whether the rate of heat input is greater or less than the rate of heat loss without thereby measuring either rate. To make this measurement, two resistance thermometers, one responsive to outdoor temperature and the other responsive to heating system temperature, may be connected in series in a bridge circuit. Then the heating system may be regulated to keep the combined resistance of these two thermometers constant. When the outdoor temperature drops, the heating system temperature must be increased to keep the bridge balanced. The number of degrees rise of heating system temperature that is required to compensate for a one degree fall of outdoor temperature will depend both upon the quality of building insulation and upon the efficiency of the heating system, as for example upon the number of square feet of radiator surface in the case of a steam heating system. This relation or proportionality between the outside temperature drop and heating system temperature rise will vary from building to building and generally cannot be known accurately in advance of the installation of a heating system.

It is desirable that the temperature proportionality factor of the control system be matched to that of the building itself, since if it be not so matched the control system will respond to a drop of outside temperature to call for an increase of heating system temperature different from that required by the characteristics of the building itself, and so will tend to maintain the building temperature at some value which varies with outdoor temperature. Under certain conditions it is desirable to maintain building temperature substantially constant for all weather conditions, and under other circumstances it is desirable to change the air temperature to compensate for other factors. Thus, for example, it may be desirable to maintain the room air several degrees warmer during severe weather conditions to partially compensate for the reduced humidity that obtains during cold weather. It is desirable that the temperature proportionality of the control system, that is, the proportionality of its responses to heating system and outdoor temperature, be easily adjustable so that it may be brought to substantially the correct value at the time of the installation of the heating and control system, and so that the occupants of the building may change this factor from time to time to accommodate their own comfort and convenience, or to compensate for changed conditions such as may result from putting on storm windows or from turning off certain radiators in the heated space.

The system of my prior patent includes means for making such an adjustment of the proportionality factor of the control system but the adjustment generally cannot be made without disturbing other adjustments of the apparatus. Furthermore, the apparatus of my prior patent cannot be conveniently arranged to permit the adjustment to be made at the control panel itself, but rather requires either that the adjustment be made at the thermometer itself which generally will be located remote from the control panel, or else requires a large number of separate wires to be run from the control panel to the thermometer.

Objects of the present invention include the provision of an improved electric bridge circuit, the provision of an improved circuit for making and coordinating a plurality of simultaneous measurements wherein the relative effectivenesses of the separate measurements may be adjusted without thereby disturbing other adjustments of the circuit, the provision of an improved electrical measuring system responsive to a number of separate conditions wherein the separate effects of the several factors may be conveniently adjusted while the system is in operation, and the provision of an improved control system.

Other objects and advantages of the invention will appear as the description proceeds.

The following description of one specific embodiment of my invention serves by way of example to illustrate the manner in which the invention may be practiced, but the invention is not limited to the details of any particular embodiment or example.

In the drawing the single figure illustrates diagrammatically a modified Wheatstone bridge circuit embodying my present invention.

The system of bridge circuits illustrated in the drawing constitutes the temperature measuring portion of a heating and control system such as that shown in my prior patent already referred to. The circuit includes two fixed resistors 10 and 12 connected in series in one bridge branch which is common to two separate Wheatstone bridges so that the resistors 10 and 12 constitute the ratio arms of both of those Wheatstone bridges. A total of three separate bridge branches are connected permanently across the terminals of a battery 14 and a galvanometer relay 16 is arranged to be connected first to one Wheatstone bridge and then the other to make the two separate measurements. One bridge measures room temperature and the other measures a relation between heating system temperature and outside temperature.

The bridge for measuring room temperature employs the bridge branch containing the two ratio arm resistors 10 and 12 and also a second bridge branch containing fixed resistors 18 and 20 and a temperature responsive resistor 22 which latter resistor constitutes the room thermometer. In practice, the room thermometer will, of course, be located remote from the control apparatus itself in the space whose temperature is to be controlled, although that circumstance is not depicted by the circuit diagram. The galvanometer 16 is permanently connected to the center tap 24 of a low resistance potentiometer 26 connected between, and in series with, the two fixed resistors 10 and 12 which constitute the ratio arms of the bridges. It is connected also to the center contact arm 34 of a double throw switch 30 which under certain conditions connects the galvanometer to the center tap 38 of a low resistance potentiometer 40 connected in the room thermometer branch containing the resistors 18, 20, and 22. The potentiometer 40 constitutes a centering adjustment with which to compensate for manufacturing tolerances in the several resistance values so as to bring the bridge into initial adjustment after its installation. The potentiometer 26 constitutes an adjustment for varying the temperaure at which the system tends to maintain the space to be heated and, conveniently may be located in the heated space itself remote from the control panel.

A third bridge branch includes fixed resistors 42 and 44 in one arm and an outdoor thermometer 46 and the heating system thermometer 48 connected in series in the other arm; and includes also a centering potentiometer 50 connected between, and in series with, these two adjacent bridge arms. Two similar and mechanically coupled potentiometers 52 and 54 shunt the adjacent bridge arms which constitute this third bridge branch. Thus the potentiometer 52 shunts the two fixed resistors 42 and 44 with its center tap 53 connected at the junction between the two resistors 42 and 44, and similarly the potentiometer 54 shunts the thermometers 46 and 48 with its center tap 55 connected to the junction between them. The two potentiometers 52 and 54 are connected together mechanically and are adapted to be operated together by the single manual control knob 56. The center tap 51 of the centering potentiometer 50 is connected through a sensitivity controlling rheostat 58 to the switch 30 which in turn connects it under certain conditions to the galvanometer 16.

Overlooking for the moment the shunting effect of the potentiometers 52 and 54 upon the resistors 42, 44, 46, and 48, it is apparent that the two thermometer resistors 46 and 48 are connected in series and that with the bridge otherwise balanced a drop in outside temperature and a consequent lowering of the resistance 46 requires a rise of heating system temperature for increasing the resistance 48 to return the bridge in its balanced condition.

The values of the resistances 42, 44, 46, and 48 are so chosen that under conditions of zero heat input, that is, when outside temperature and heating system temperature are equal and at approximately the required room temperature, those values stand in the ratio of A1 is to A2 as B1 is to B2, and the total resistance values of the two potentiometers 52 and 54 stand in the same ratio. Then, since the potentiometers 52 and 54 are of similar construction and constrained to operate together, the shunted values of the resistors 42 and 44, and also 46 and 48 stand in the same ratio as their unshunted values regardless of the adjusted positions of the potentiometers 52 and 54. When the potentiometers 52 and 54 are turned to their extreme left position, as seen in the diagram, the resistor 42 and the outdoor thermometer 46 are substantially short circuited while a minimum shunting effect is imposed on the resistor 44 and the heating system thermometer 48. Under such a condition the outdoor thermometer 46 would have substantially no effect on the balanced condition of the bridge circuit. As the potentiometers 52 and 54 are rotated toward the right the shunting effects on the resistor 42 and outdoor thermometer 48 are reduced, while those on the resistor 44 and heating system thermometer 48 are gradually increased until in the extreme right position of the potentiometers 52 and 54, the heating system thermometer 48 is shorted out so as to have substantially no effect on the balanced condition of the bridge. The balanced condition of the bridge is substantially independent of the adjustment of the potentiometers 52 and 54 when the two thermometers 46 and 48 are at the required room temperature, but under any other conditions the relative temperatures required of the two thermometers 46 and 48 to bring the bridge into balance will depend in part on the particular setting of the two potentiometers 52 and 54.

As I have already stated, this bridge circuit, shown herein, constitutes the temperature measuring apparatus for a heating control system. In operation, the switch 30 connects the galvanometer 16 alternately to the room thermometer bridge and the outdoor-temperature and heating-system-temperature bridge, and the galvanometer 16 in turn controls the operation of the heating system in accordance with the temperature measurements so made. After the system has been installed, and the centering potentiometers 26, 40, and 50 have been initially adjusted to the correct settings, the potentiometers 52 and 54 are brought to their correct setting for the particular building in the following manner. With the preliminary adjustments properly made, the bridge for measuring outside and heating system temperatures will be in balance when the outside and heating system thermometers are both at the temperature at which the system tends to maintain the space to be heated, in accordance with the setting of the potentiometer 26. The potentiometers 52 and 54 should be set at some point intermediate their two extreme adjustments, the rheostat 58 adjusted to its minimum resistance, and the heating system put into operation. Preferably the adjustment should be made when the system is operating under severe weather conditions, since the adjustment may be made most accurately when wide temperature differences are encountered. With the heating system in operation in this manner, the system will tend to maintain the room temperature at some particular value, which value will not necessarily be the one for which the room adjustment potentiometer 26 is set. Accordingly, the potentiometers 52 and 54 should be manipulated until the system controls the room temperature to maintain it at the desired value under this severe weather condition. The potentiometers 52 and 54 will then have been brought to the correct adjustment for giving to the two thermometers 46 and 48 the correct relative effects to match the requirements of the building and its particular heating system.

If the potentiometers 52 and 54 are adjusted too far to the right, the heating system thermometer 48 will be shunted too much and consequently it will have too small an effect on the bridge circuit. As a result, the particular adjustment of the bridge will require the heating system to increase to too high a temperature to correspond to a particular outside temperature, and consequently the system will increase the heat supply too much in response to a given drop of outside temperature and so actually raise the room temperature as the outdoor temperature drops. On the other hand, if the potentiometers 52 and 54 are adjusted too far to the left, they will overshunt the outdoor thermometer 46 and give to the heating system thermometer 48 too great an effect so that when outdoor temperature drops the bridge will be returned to balance by an increase of heating system temperature less than that required to maintain the indoor temperature at its former value, and so will permit the room temperature to drop somewhat as the outdoor temperature drops. As I have previously pointed out, it may be desirable under certain conditions to permit the room temperature to change slightly as the outdoor temperature changes, and the potentiometers 52 and 54 may be adjusted to give this effect to any desired degree.

An adjustment of the potentiometers 52 and 54 does not disturb the initial balanced condition of the system, that is, it does not alter the temperature at which the outdoor-heating-system bridge tends to maintain the heated space under mild weather conditions that require substantially no heat input to the space. That temperature or "control point" is determined by the setting of potentiometer 26. But since the potentiometers 52 and 54 are intended to regulate the manner in which that control point varies with outdoor temperature, any change of setting of the potentiometers 52 and 54 while the heating system is operating with an appreciable load, will serve to shift the "control point" accordingly.

It is thus seen that I provide a simple and improved bridge circuit for a measuring and control system wherein the relative effects of the different temperatures or conditions, on which the measurements depend, may be adjusted conveniently and without disturbing other adjustments of the bridge circuit.

It will be apparent to those skilled in the art that the specific embodiment of the invention herein illustrated and described is offered merely by way of illustration and example, and that the invention is capable of numerous modifications and variations. For example, the invention is not limited to bridge circuits of the direct current type nor to bridge circuits of the resistor type, nor is it limited to use for temperature control. The invention is to be limited only in accordance with the scope of the appended claims.

I claim:

1. In combination in an electric bridge circuit, a pair of similar electrical impedance networks, one of which is included in each of a pair of adjacent arms of the bridge, a separate adjustable impedance element in each of said networks, said two adjustable elements being similar in construction and similarly arranged and located in their respective networks, said two adjustable elements being further so constructed and arranged that they are constrained to operate together, said two impedance networks together containing two condition responsive impedance elements, one of said two condition responsive elements being so located in its network that its effectiveness to vary the impedance of that network by changes in its own impedance is regulated by an operation of the adjustable element of that network, the other of said two condition responsive impedance elements being connected in one of said networks in a position non-similar to the position of the first mentioned condition responsive element and non-similarly responsive to adjustment of said adjustable elements, whereby an operation of said adjustable elements alters the relative effectivenesses of the two condition responsive elements to vary the relative resultant impedance values of the bridge arms.

2. In combination in an electric bridge circuit, a pair of condition responsive elements in one arm of said bridge circuit, each of which elements is responsive to a separate variable condition, a second pair of impedance elements included in a bridge arm adjacent to the first mentioned arm and corresponding to said two condition responsive elements in that each of said second pair of impedance elements is respectively similar to one of said condition responsive elements and is similarly located in its own bridge arm, an adjustable impedance element included in the first arm of the bridge and so positioned and controlled that it functions to regulate the relative effectivenesses of said two condition responsive elements to changes in the conditions to which they respond, a similar adjustable impedance element connected similarly in the second bridge arm, and means for operating said two adjustable impedance elements together to simultaneously and similarly vary the resultant impedance values of said two bridge arms.

3. In combination in an electric bridge circuit, a pair of impedance elements in series in each of two adjacent arms of said bridge circuit, a separate potentiometer shunting each separate serially connected pair of said impedance elements, the adjustable tap of each potentiometer being connected to a point between the two serially connected impedance elements which it shunts, said two potentiometers being of similar construction, being so constructed and connected together that they are constrained to operate together so that when operated each increases its shunting effect on the first one of its two serially connected impedance elements while decreasing the shunting effect on the second element, each impedance of one of said bridge arms being proportional to the corresponding impedance of the other bridge arm so that the impedance values of said first two impedance elements stand in approximately the same ratio as the impedance values of said two second impedance elements and also in approximately the same ratio as the impedance values of said two potentiometers.

4. In combination in an electric bridge circuit, a condition responsive impedance element in one arm of said bridge circuit, a second impedance element in an adjacent arm of the bridge circuit, a variable impedance element so connected in said first arm of the bridge circuit that it is operable to change the effectiveness of said condition responsive element for varying the impedance of said first bridge arm, a similar variable impedance element similarly connected in the second bridge arm with respect to said second impedance element, and means for varying said two variable elements together to simultaneously and similarly vary the resultant impedance values of said two bridge arms.

5. In combination in an electric bridge circuit, a separate pair of impedance elements in series in each of two adjacent arms of said bridge circuit, a separate adjustable impedance element shunting the first one of each pair of said serially connected impedance elements, said adjustable impedance elements being of similar construction and so connected together and constructed that they are constrained to operate together, so that when operated, each said adjustable element increases or decreases its shunting effect simultaneously with the corresponding action of the other, each impedance of the one of said bridge arms being so proportioned to the corresponding impedance of the other bridge arm, that the impedance values of said first two impedance elements of said serially connected pair stand in approximately the same ratio as the impedance values of said second impedance elements of said serially connected pairs, and also in approximately the same ratio as the impedance values of said two variable shunts.

6. In combination in an electric bridge circuit, a pair of similar electrical impedance networks, one of which is included in each of a pair of adjacent arms of the bridge, each said network having two current paths in shunt, a separate variable impedance element in each of said similar networks, connected in one of the shunt current paths thereof, means for varying said two variable elements together to simultaneously and similarly vary the resultant impedance values of said two bridge arms, and a condition responsive element included in one shunt path of one of said two networks.

7. In combination in a condition controlling apparatus, an electric bridge circuit, a pair of similar electrical impedance networks, one of which is included in each of a pair of adjacent arms of the bridge, a separate adjustable impedance element in each of said networks, said two adjustable elements being similar in construction and similarly arranged and located in their respective networks, said two adjustable elements being further so constructed and arranged that they are constrained to operate together, said two impedance networks together containing two condition responsive impedance elements, one of which is responsive to a measure of an effect that tends to disturb the condition being controlled, and the other of which is responsive to a measure of a corrective effect upon said condition being controlled, the first of said two condition responsive elements being so located in its network that its effectiveness to vary the impedance of the network by changes in its own impedance is regulated by an operation of the adjustable element of that network, the other of said two conditions responsive impedance elements being connected in one of said networks, but in a position nonsimilar to the position of the first condition responsive element and subject to different control by the simultaneous similar operation of said adjustable elements, whereby an operation of said adjustable elements alters the relative effectivenesses of the two condition responsive elements and the respective measurements to which they respond to vary the relative resultant impedance values of the bridge arms.

8. In combination in a temperature control apparatus for a heating system, an electric bridge circuit, a pair of temperature responsive impedance elements in one arm of said bridge circuit, one of which elements is responsive to a measure of the uncontrolled heat loss or gain from the space, and the other of which is responsive to a measure of the controlled heat transfer between said space and the regulating system, a second pair of impedance elements included in a bridge arm adjacent to the first mentioned bridge arm and corresponding to said two temperature responsive elements in that each of said second pair of impedance elements is respectively similar to one of said temperature responsive elements and is similarly located in its bridge arm, an adjustable impedance element included in the first arm of the bridge circuit and so positioned and controlled that it functions to regulate the relative effectivenesses of said two temperature responsive elements to changes in the respective heat transfer rates to which they respond, a similar adjustable impedance element connected similarly in the second bridge arm, and means for operating said two adjustable impedance elements together to simultaneously and similarly vary the resultant impedance values of said two bridge arms, each impedance of each of said bridge arms being proportioned to the corresponding impedance of the other bridge arm so that each impedance element of one arm of said bridge stands in the same ratio to the impedance value of the corresponding element of the said adjacent arm of said bridge when the temperature of said space is at its required value and both the controlled and uncontrolled rates of heat exchange are substantially zero.

EDWIN DE WITT COLEMAN.